J. W. REIFSNIDER.
LUBRICATED SPRING.
APPLICATION FILED JULY 12, 1916.
1,209,030.
Patented Dec. 19, 1916.
2 SHEETS—SHEET 1.
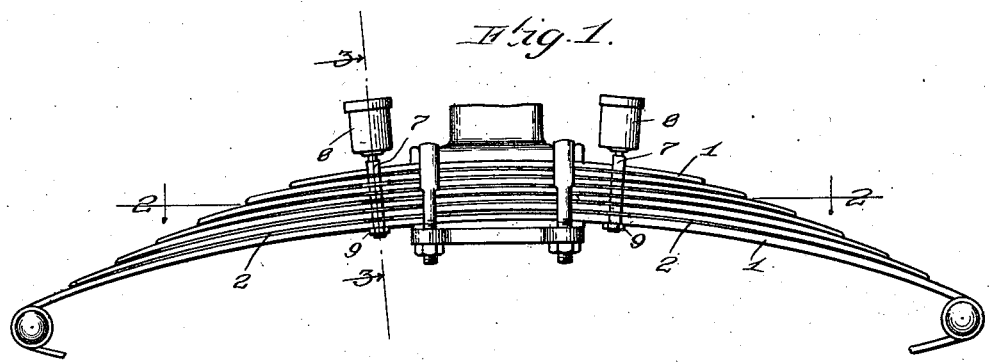
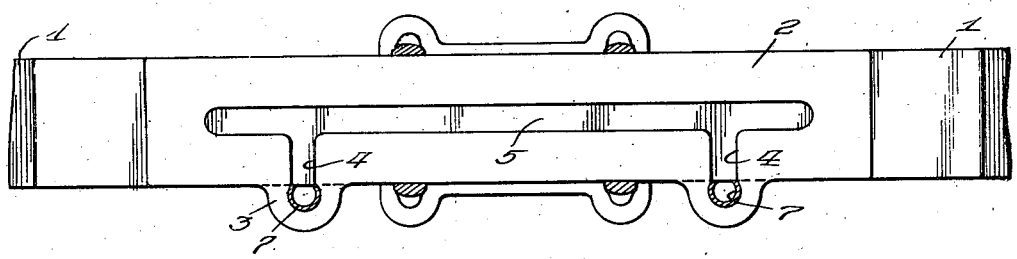
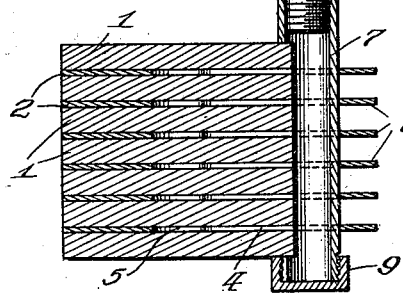
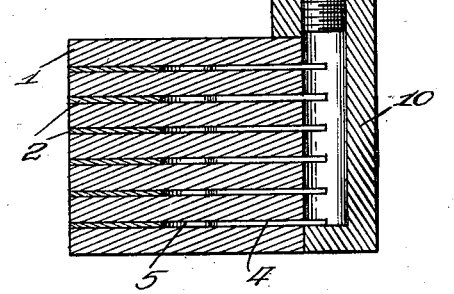
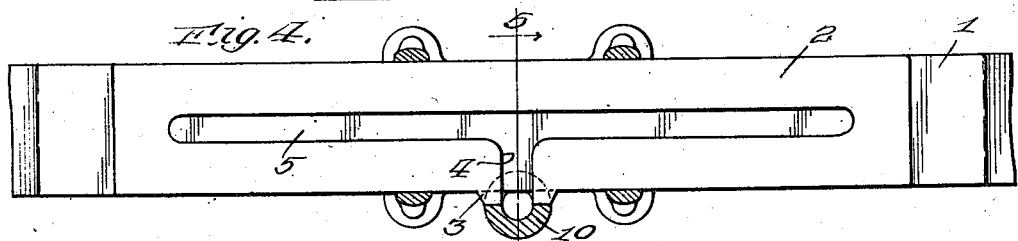
Inventor:
John W. Reifsnider
by Albert Scheibli, Attorney
Witness:
R. L. Farrington J. W. REIFSNIDER.
LUBRICATED SPRING.
APPLICATION FILED JULY 12, 1916.
1,209,030.
Patented Dec. 19, 1916.
2 SHEETS—SHEET 2.
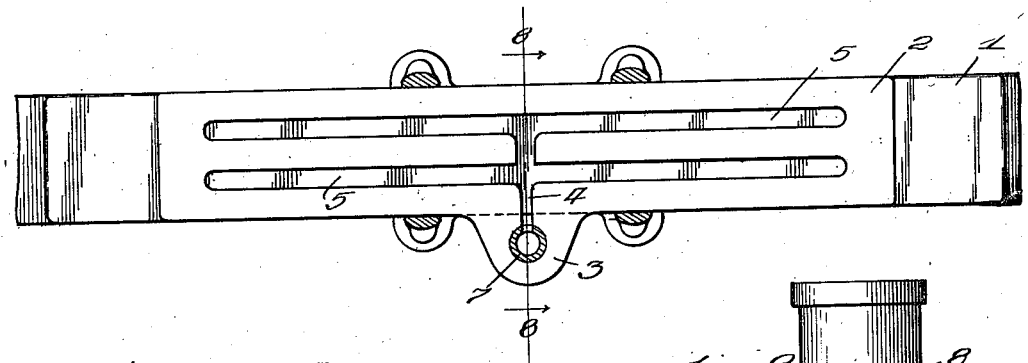
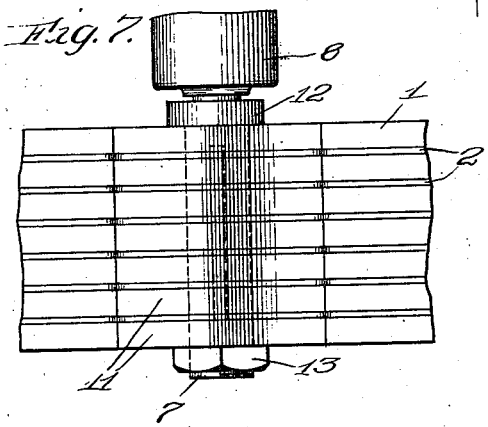
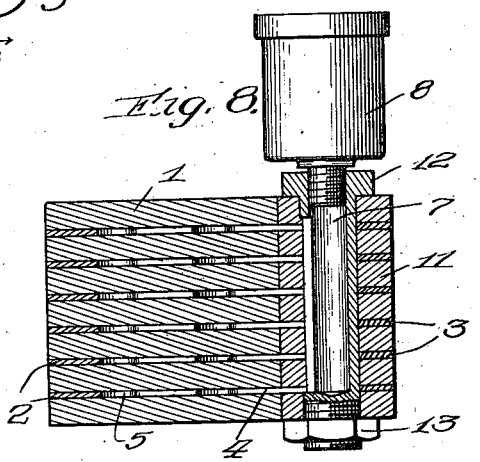
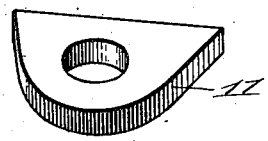
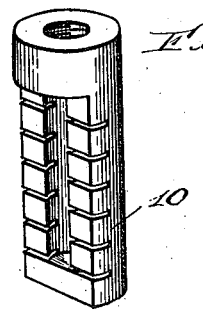
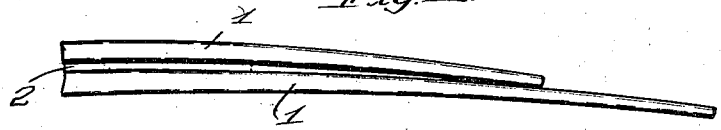
Witness:
P. L. Farrington
Inventor:
John W. Reifsnider
by Albert Scheible, Attorney

UNITED STATES PATENT OFFICE.

JOHN W. REIFSNIDER, OF CHICAGO, ILLINOIS, ASSIGNOR TO HENRY J. FRERKS, OF CHICAGO, ILLINOIS.

LUBRICATED SPRING.

1,209,030.      Specification of Letters Patent.      Patented Dec. 19, 1916.

Application filed July 12, 1916. Serial No. 108,788.

*To all whom it may concern:*

Be it known that I, JOHN W. REIFSNIDER, a citizen of the United States, residing at Chicago, in the county of Cook and State of Illinois, have invented certain new and useful Improvements in Lubricated Springs; and I do hereby declare the following to be a full, clear, and exact description of the invention, such as will enable others skilled in the art to which it appertains to make and use the same.

My invention relates to laminated springs, such as the leaf springs commonly used upon vehicles, its general object being to provide simple, positive and easily operable means for lubricating the contiguous faces of the spring leaves.

More particularly, my invention aims to provide means for supplying such lubrication over a considerable portion of the length of the leaves, to provide a construction which may easily be applied to various types of laminated springs regardless of the method by which the spring leaves are held in operative position, and to provide easily accessible means for replenishing the supply of lubricant.

In U. S. Patent 1,185,950, issued to me on June 6th, 1916, I have disclosed a lubricated spring in which the lubricant is fed through a passage extending transversely through substantially all of the leaves of the spring, as for example through a passage formed in a central bolt which forms part of the means for holding the leaves in their desired relation to each other. This construction necessitates the perforating of practically all of the spring leaves, that is to say, both of the main resilient leaves and of the spacer or insert leaves which afford lubricant feeding ducts extending longitudinally of the leaves. Such a perforating, particularly of the main leaves which afford the greater part of the resiliency and which are weakened by any perforations therein, is objectionable and especially undesirable where the method of maintaining the spring leaves in operative position does not involve such a perforating.

My present invention relates to a construction in which the perforating or other reduction in the cross-section or strength of the leaves is limited to the insert leaves which afford the lubricant-supply ducts and in which these inserts may be interposed between the leaves of standard types of springs without machining or in any way altering these last named leaves. It also aims to support the supply of lubricant in a position where no extra head room will be required for it directly over the spring, thereby adapting my invention for use on vehicles where there is little or no room directly over each spring.

Further objects will appear from the following specification and from the accompanying drawings, in which—

Figure 1 is a fragmentary elevation of an elliptical spring equipped with my invention. Fig. 2 is an enlarged fragmentary section taken along the upper surface of one of the insert leaves at the line 2—2 of Fig. 1. Fig. 3 is a fragmentary enlarged transverse section along the line 3—3 of Fig. 1. Fig. 4 is a view similar to Fig. 2 but showing the use of inserts having forked projections leading into a slotted tube. Fig. 5 is an enlarged transverse section along the line 5—5 of Fig. 4. Fig. 6 is a view similar to Fig. 2, but showing an insert leaf having a single side inlet ear connected to a pair of longitudinal slots. Fig. 7 is a fragmentary side elevation of the embodiment shown in Fig. 6. Fig. 8 is a transverse vertical section through the same along the line 8—8 of Fig. 6. Fig. 9 is a perspective view of one of the spacer washers used in the embodiment of Figs. 7 and 8. Fig. 10 is a perspective view of the slotted tube used in the embodiment of Fig. 5. Fig. 11 is an enlarged fragmentary side elevation of one end of the leaf spring.

In carrying out my invention, I employ inserts 2 disposed between the main leaves 1 of the spring, each insert having a slot formation extending into a portion 3 of the insert which projects laterally beyond the edge of the adjacent main spring leaves. The thickness of the inserts, the arrangement of the slots or ducts, and the shape of the ears or lateral projections may all be varied considerably, as also the material of which these inserts are made. However, the portions of the slots or ducts disposed outside the main leaves of the spring are preferably in alinement with each other, so that they may be connected by common inlet means to a suitable lubricant supply. For example, in Figs. 1 to 3, each insert has a pair of transverse slots 4 leading from the main slot 5 (which latter extends longitudinally of the spring) to perforations in ears 3. Extending substantially vertically through these ears is a tube 7 carrying at its top a grease cup 8 and at its bottom a cap 9, a portion of one side being cut away so that the cap may clamp the tube to the spring leaves and also to afford a vertical opening connecting the bore of the tube with the transverse or inlet slots 4 of the inserts between the respective main leaves of the spring. Or, each insert may have a single inlet slot terminating at the extreme edge of a lateral projection as in Fig. 4, in which case the portions of these projections at each side of the inlet slots may enter corresponding horizontal slots in an inlet member 10 as shown in Figs. 5 and 10. Likewise, each insert may have a plurality of longitudinal slots (as in Fig. 6) and the ears or projecting portions of the successive inserts may be spaced by washers 11, as in Figs. 7 and 8, thereby permitting these projecting ears to be firmly clamped between suitable designed portions of the inlet means, such as the flange 12 and the nut 13 of Fig. 8. To afford an effective lubrication without wasting lubricant, I preferably use insert leaves somewhat shorter than either of the main spring leaves adjacent thereto and preferably also chamfer each end of the insert to a relatively thin tip, thereby permitting the tips of the successive spring leaves to contact directly with each other beyond the ends of the interposed insert, as shown in Fig. 11. I also preferably terminate the slot or duct formation within the unchamfered center portion of the insert, so that the lubricant will be fed through this duct to points near the beginning of the chamfer or slope, from which points the lubricant will readily be fed farther toward the tips of the main spring leaves by the relative longitudinal movement of these leaves when the spring is in action.

It will be obvious that by using a force-feed grease cup, the lubricant can readily be supplied throughout the entire length of the slot formations and that this supply will be replenished as fast as it is consumed by the relative sliding of the leaves comprising the laminated spring, but will not otherwise be forced out or wasted. Moreover, by placing the lubricant supply at one side of the spring, my invention can readily be adapted to vehicle springs having but little head room directly over the spring, and by varying the width of the slots or ducts the supply of lubricant can be proportioned to different consistencies of the latter. However, while I have shown and described the lubricant-feeding inserts as having chamfered ends and as being fed from grease cups mounted on the lubricant inlet tubes, I do not wish to be limited to these or others of the details herein described, it being obvious that the latter can be varied in many ways without departing from the spirit of my invention.

I claim as my invention:

1. A spring structure including main leaves alternating with auxiliary leaves, each of the latter being equipped with a projection extending beyond the adjacent main leaves and with a passage extending from said projection into the auxiliary leaf.

2. A spring structure including main leaves alternating with auxiliary leaves, each of the latter being equipped with a projection extending beyond the adjacent main leaves and with a passage extending from said projection into the auxiliary leaf, in combination with common means for supplying lubricant to the portions of said passages disposed in said projections.

3. A spring structure including main leaves and auxiliary leaves interposed therebetween, each auxiliary leaf equipped with a lateral projection extending beyond the edge of the adjacent main leaves and with a passage extending longitudinally of the auxiliary leaf and into said projection.

4. A spring structure including main leaves and auxiliary leaves interposed therebetween, each auxiliary leaf equipped with a lateral projection extending beyond the edge of the adjacent main leaves and with a passage extending longitudinally of the auxiliary leaf and into said projection, in combination with spacer elements interposed between the projections on successive auxiliary leaves and equipped with passages connecting the portions of the aforesaid passages disposed in the said projections.

5. A spring structure including main leaves and auxiliary leaves interposed therebetween, each auxiliary leaf equipped with a lateral projection extending beyond the edge of the adjacent main leaves and with a passage extending longitudinally of the auxiliary leaf and into said projection, and a supply of lubricant connected to all of the said passages through the said projections.

6. A laminated spring including certain leaves having portions extending laterally beyond other leaves, there being lubricant-supply ducts associated with the first named leaves, and means for feeding lubricant to said ducts through the said laterally extending leaf portions.

7. A laminated spring including main leaves and spacer leaves, each of the latter having a pair of ears projecting laterally beyond adjacent main leaves and having a passage extending from each ear into the main portion of the leaf and thence longitudinally of the leaf.

8. A spring structure including main leaves and auxiliary leaves interposed therebetween, each auxiliary leaf equipped with a lateral projection extending beyond the edge of the adjacent main leaves and with a passage extending longitudinally of the auxiliary leaf and into said projection, and a tube associated with the portions of the passages disposed in said projections, said tube having openings leading to said passages.

9. A laminated spring including main leaves, inserts interleaved therewith, each of said inserts being equipped with a lateral projection and a duct leading into said lateral projection, and lubricant-supply means disposed adjacent to said lateral projections and connected to the ducts in all of the latter.

10. A laminated spring including main leaves, inserts interleaved therewith and equipped with alined lubricant-inlets disposed at an edge of each insert, and a lubricant-supply member connected to all of said inlets, said member engaging portions of both the inserts and the main leaves to confine the exit of lubricant from said member to said inlets.

11. A laminated spring structure including main leaves, and insert leaves alternating therewith and equipped with duct formations, each insert leaf being shorter than the main leaves adjacent thereto and being gradually reduced in thickness toward its end to permit the said adjacent leaves to contact with each other beyond said end of the insert leaf.

12. A laminated spring structure including main leaves, and insert leaves alternating therewith and equipped with lubricant-carrying formations, each insert leaf being shorter than the main leaves adjacent thereto and being gradually reduced in thickness toward one end to permit the said adjacent leaves to contact with each other beyond said end of the insert leaf, the lubricant-carrying formation in the insert leaf being disposed only in the unreduced portion of the latter.

13. A laminated elliptical spring structure including curved main leaves, and auxiliary leaves interposed between the consecutive main leaves and each of substantially crescent-shaped longitudinal section, each auxiliary leaf being shorter than both of the adjacent main leaves and equipped with a lubricant-supply duct extending longitudinally thereof.

14. The combination with two leaves of a laminated spring, of a relatively shorter insert leaf interposed therebetween and chamfered at each end to a relatively thin edge, there being means associated with the insert leaf for conveying lubricant to the opposed faces of both of the aforesaid leaves.

Signed at Chicago, Illinois, July 7th, 1916.

JOHN W. REIFSNIDER.